(12) United States Patent
Keller

(10) Patent No.: US 7,730,740 B2
(45) Date of Patent: Jun. 8, 2010

(54) COOLING DEVICE FOR PET CARRIER

(76) Inventor: Joseph Keller, 3149 10th St., Port Arthur, TX (US) 77642

( * ) Notice: Subject to any disclaimer, the term of this patent is extended or adjusted under 35 U.S.C. 154(b) by 218 days.

(21) Appl. No.: 11/812,059

(22) Filed: Jun. 14, 2007

(65) Prior Publication Data

US 2008/0022714 A1 Jan. 31, 2008

Related U.S. Application Data

(60) Provisional application No. 60/833,495, filed on Jul. 27, 2006.

(51) Int. Cl.
*F25D 3/02* (2006.01)
*F25D 25/00* (2006.01)
(52) U.S. Cl. .............. 62/459; 62/464; 62/465; 62/530
(58) Field of Classification Search .......... 62/457.2, 62/459, 464, 465, 466, 530
See application file for complete search history.

(56) References Cited

U.S. PATENT DOCUMENTS

| | | | |
|---|---|---|---|
| 3,757,852 A | 9/1973 | Allinger | |
| 4,064,835 A * | 12/1977 | Rabenbauer | 119/28.5 |
| 4,691,664 A | 9/1987 | Crowell | |
| 4,798,173 A | 1/1989 | Wilgren | |
| 4,899,693 A | 2/1990 | Arnold | |
| 5,727,503 A * | 3/1998 | Whittaker | 119/500 |
| 6,084,209 A * | 7/2000 | Reusche et al. | 219/217 |
| 6,439,165 B1 | 8/2002 | Guard | |
| 6,536,228 B1 | 3/2003 | Hall | |
| 6,553,935 B1 * | 4/2003 | Penner | 119/28.5 |
| 6,647,924 B1 | 11/2003 | Zwicker et al. | |
| 6,708,646 B1 | 3/2004 | Wang | |
| 2002/0023594 A1 | 2/2002 | Greene, Jr. | |
| 2005/0284416 A1 | 12/2005 | Smit et al. | |
| 2007/0012069 A1 * | 1/2007 | Girard | 62/459 |

FOREIGN PATENT DOCUMENTS

| | | |
|---|---|---|
| JP | 2003125662 | 5/2003 |
| JP | 2003210059 | 7/2003 |
| JP | 2004267036 | 9/2004 |

* cited by examiner

*Primary Examiner*—Daniel C Comings
(74) *Attorney, Agent, or Firm*—Richard C. Litman

(57) ABSTRACT

The cooling device for a pet carrier is a portable system for providing an ice-cooled surface on which a pet can rest. The cooling device includes a housing defining an open interior region therein, adapted for receiving a volume of ice. An opening is formed through an upper surface of the housing, and a lid is pivotally joined to the housing for selectively and releasably covering and sealing the opening. A plurality of apertures are formed through the lid, and a plurality of spikes are secured to a lower surface of the lid and project downwardly therefrom. When the volume of ice is received within the housing, the lid may be closed and the spikes evenly distribute the ice within the housing. The ice generates cooled air, which may be transmitted through the apertures to a pet resting on the upper surface of the lid.

6 Claims, 3 Drawing Sheets

COOLING DEVICE FOR PET CARRIER

CROSS-REFERENCE TO RELATED APPLICATION

This application claims the benefit of U.S. Provisional Patent Application Ser. No. 60/833,495, filed Jul. 27, 2006.

BACKGROUND OF THE INVENTION

1. Field of the Invention

The present invention relates to a cooling device for a pet carrier. Particularly, the cooling device is a portable system for providing an ice-cooled surface on which a pet can rest, adapted to be received within a conventional pet carrier.

2. Description of the Related Art

Pet animals are often difficult to transport, particularly within vehicles, such as automobiles or airplanes. Thus, many pet owners utilize a pet carrier, which is generally a portable cage, sized and contoured for easy transportability. Pet carriers, however, are often quite uncomfortable for the pets stored therein. Simple pet carriers often provide for basic ventilation, but do not offer any other form of temperature control for the pet. Excessive temperatures within a pet carrier can be both uncomfortable and potentially hazardous for the animal.

Although pet beds and the like having refrigeration and air conditioning systems have been utilized, such systems require heavy and complex equipment and are not typically portable. Further, such systems are not adapted for reception within a pet carrier, as they are typically stand-alone cooling units. Thus, a cooling device for pet carrier solving the aforementioned problems is desired.

SUMMARY OF THE INVENTION

The cooling device for a pet carrier is a portable system for providing an ice-cooled surface on which a pet can rest. The cooling device includes a housing defining an open interior region therein adapted for receiving a volume of ice. The housing may be formed from plastic or any other suitable lightweight, portable, thermal insulation material.

An opening is formed through an upper surface of the housing, and a lid is pivotally joined to the housing for selectively and releasably covering and sealing the opening. The lid may be pivotally attached by a hinge or any other suitable pivotal fixture. A plurality of apertures are formed through the lid, and a plurality of spikes are secured to a lower surface of the lid and project downwardly therefrom. When the volume of ice is received within the housing, the lid may be closed and the spikes evenly distribute the ice within the housing. The ice generates cooled air, which may be transmitted, through the apertures, to a pet resting on the upper surface of the lid.

Preferably, the housing is dimensioned and configured to be received within a conventional pet carrier. Thus, a pet stored within the pet carrier has an ice-cooled surface to rest upon.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
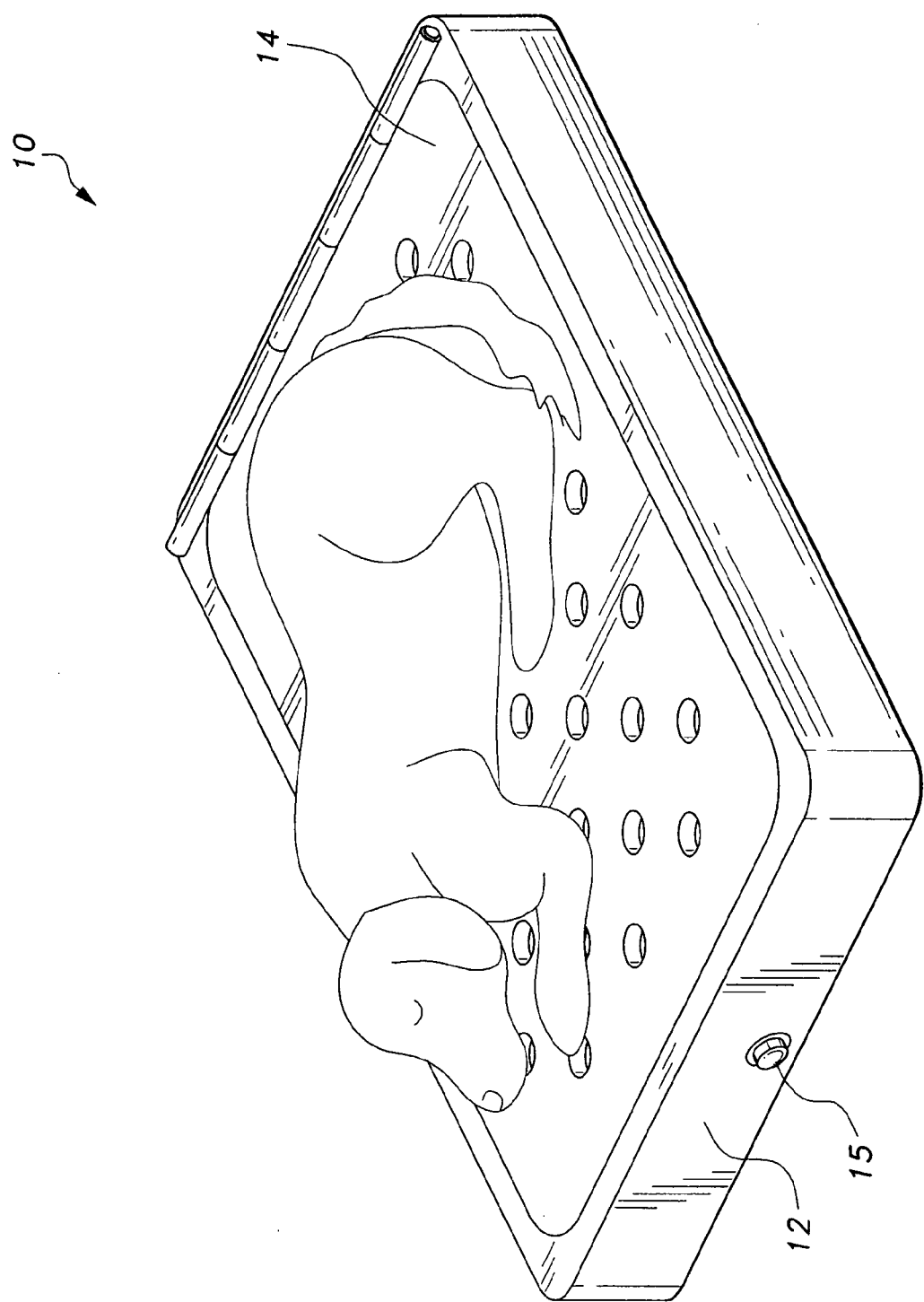
FIG. 1 is an environmental, perspective view of a cooling device for a pet carrier according to the present invention.
Figure 2:
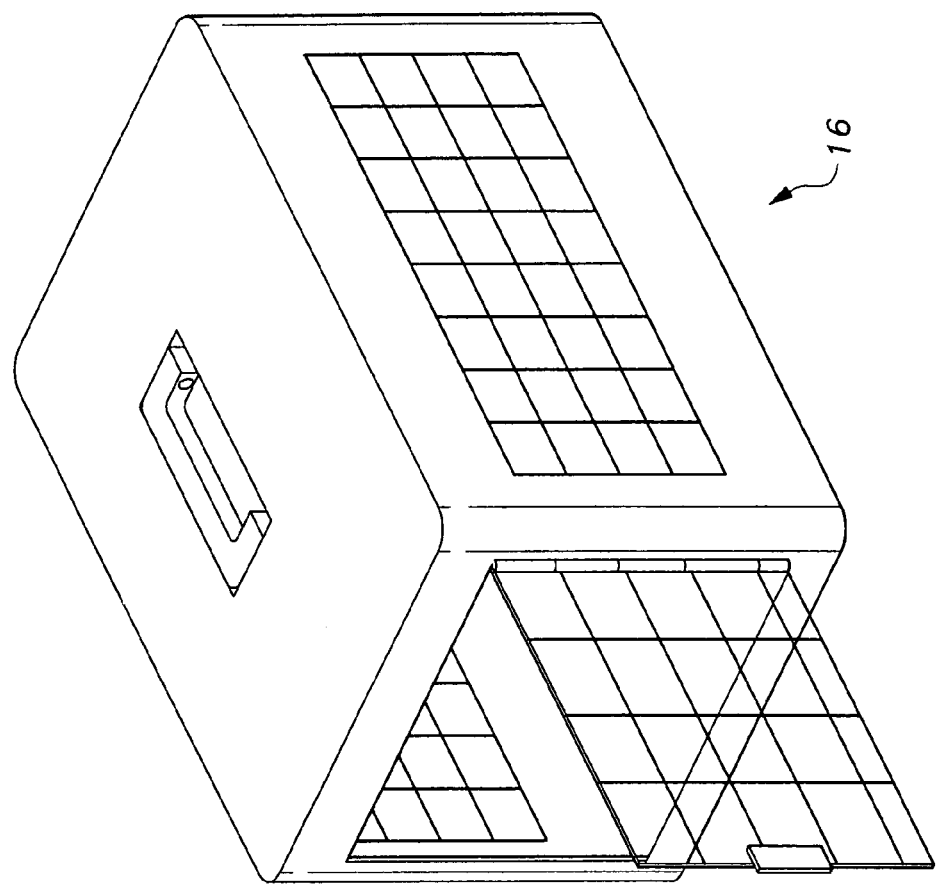
FIG. 2 is an environmental, perspective view of the cooling device for a pet carrier according to the present invention, illustrating the reception of the cooling device within the pet carrier.
Figure 2:
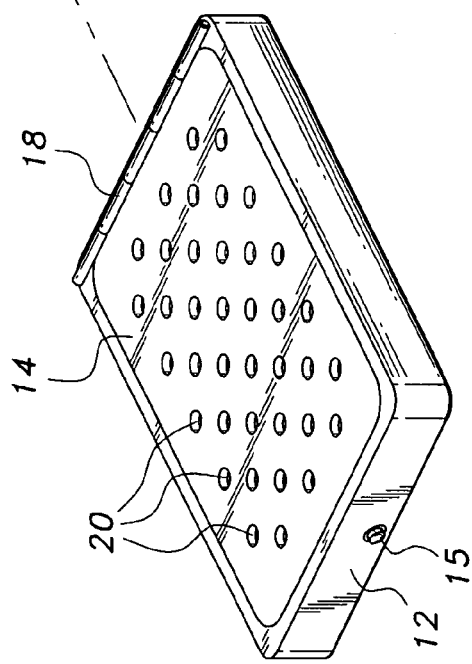
Figure 3:
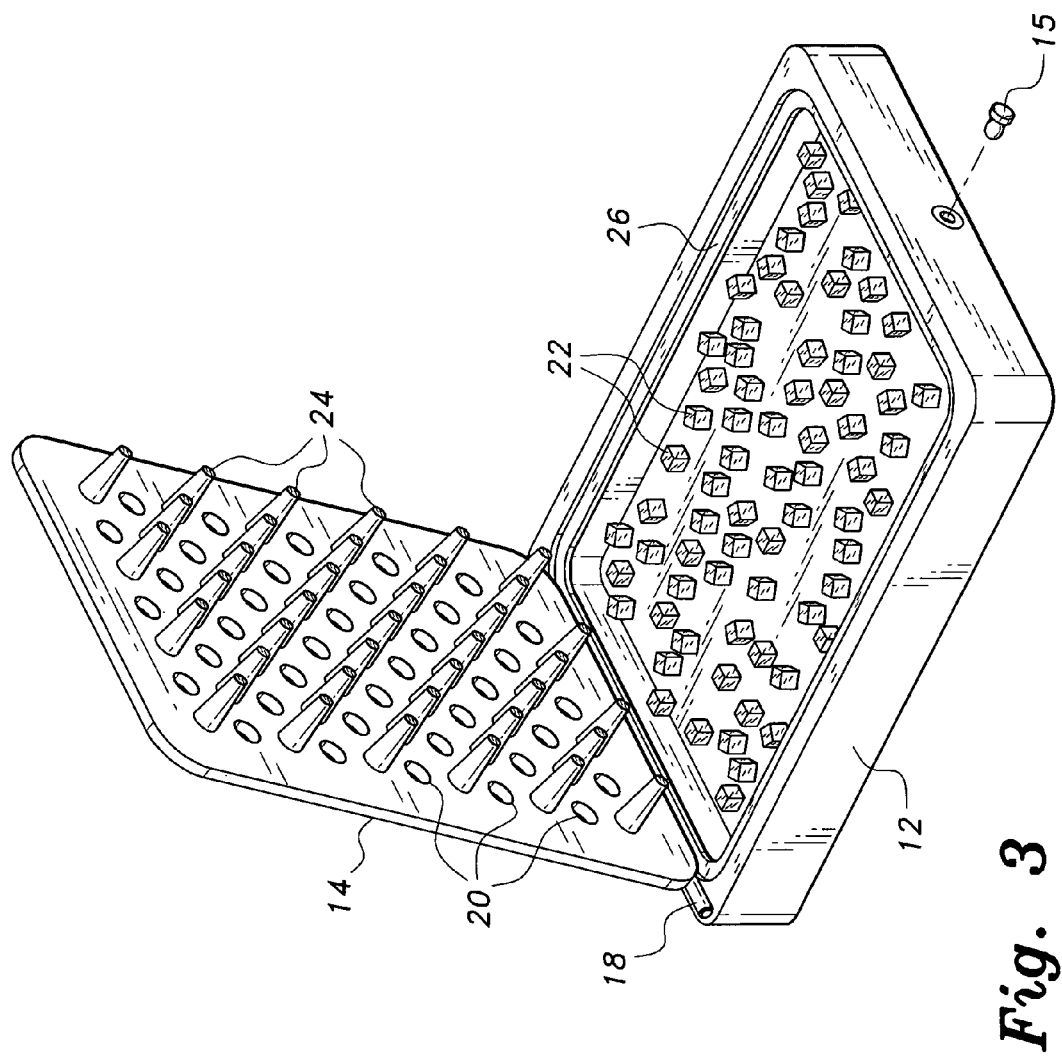
FIG. 3 is a perspective view of the cooling device for a pet carrier according to the present invention, illustrating the cooling device in an open configuration.

As illustrated in FIGS. 1-3, the cooling device for a pet carrier 10 is a portable system for providing an ice-cooled surface on which a pet can rest. The cooling device 10 includes a housing 12 defining an open interior region therein, adapted for receiving a volume of ice 22. Ice cubes 22, shown in FIG. 3, are shown for exemplary purposes only, and the ice may be formed in any suitable manner, such as irregular chunks of ice. Alternatively, any other cooling material may be utilized, such as pre-cooled gel or the like. The housing 12 may be formed from plastic or any other suitable lightweight, portable thermal insulation material. The walls defining housing 12 may be hollow structural members, such as those often associated with insulating thermoses, so that air or any other suitable thermal insulation substance may be contained therein.

An opening is formed through an upper surface of the housing 12, and a lid 14 is pivotally joined to the housing for selectively and releasably covering and sealing the opening. The lid 14 may be pivotally secured to the housing by a hinge 18 or any other suitable pivotal fixture. Lid 14 is preferably formed from plastic or any other suitable lightweight, portable, thermal insulation material. Further, lid 14 may be formed as a hollow structure, or may be formed from a solid piece of thermal insulation material. In the preferred embodiment, lid 14 frictionally engages housing 12 when in the closed position. However, it should be understood that any suitable mechanism for maintaining the lid 14 in the closed position may be used, such as clasps or the like.

A plurality of apertures 20 are formed through the lid 14, and a plurality of spikes 24 (shown in FIG. 3) are secured to a lower surface of the lid 14 and project downwardly therefrom. Spikes 24 may be formed from plastic or any other lightweight and structurally strong material. Spikes 24 may form hollow structures, or may be solid pieces. Although illustrated as being frustums of cones in the drawings, it should be understood that spikes 24 may have any desired dimension or configuration. As seen in FIG. 3, the interior of the housing 12 has a continuous ledge 26 that supports the lid 14 in a substantially flush position with the upper surface of the housing 12.

When the volume of ice, such as ice cubes 22, is received within the housing 12, the lid 14 may be closed and the spikes 24 act to evenly distribute the ice 22 within the open interior region of housing 12. This distribution of the ice 22 within the housing 12 maximizes the surface area of the ice 22, thus generating an optimal volume of cooled air within the housing 12. This cooled air is then transmitted, through apertures 20, to a pet resting on the upper surface of the lid 14. Although shown as being a dog in FIG. 1, it should be understood that the cooling device 10 may be used for providing a cool support surface for any pet animal. Alternatively, the cooling device 10, as described above, may be utilized for the cooling of non-living cargo supported on the upper surface of lid 14.

As illustrated in FIG. 2, the housing 12 is preferably dimensioned and configured to be received within a conventional pet carrier 16. Thus, a pet stored within the pet carrier 16 has an ice-cooled surface to rest upon. It should be understood that the cooling device 10 may be used outside of the pet carrier 16 or within pet carrier 16, as needed.

Further, an opening may be formed through one of the walls defining housing 12, allowing liquid water generated through the melting of ice 22 to be drained from the housing 12. Preferably, a plug 15 selectively seals the opening, allowing the user to selectively control the draining of the melted ice. It should be understood that any suitable drainage valve or control may be mounted to an exterior face of the housing 12 adjacent and covering the opening, allowing the user to drain the liquid water in a selectable and controlled manner.

It is to be understood that the present invention is not limited to the embodiment described above, but encompasses any and all embodiments within the scope of the following claims.

I claim:

1. A cooling device, consisting of:
   a housing defining an open interior region, wherein the interior region is defined by a bottom surface and sidewalls, an opening being formed through an upper surface of the housing providing access to the open interior region, wherein the opening includes a continuous ledge on the sidewalls of the housing and being located adjacent the upper surface of the housing;
   a lid pivotally joined to the housing, the lid having an upper surface and a lower surface, the lid selectively and releasably covering and sealing the opening formed through the upper surface of the housing, wherein the lower surface of the lid engages the continuous ledge whereby the upper surface of the lid forms a substantially continuous surface with the upper surface of the housing, a plurality of apertures being formed through the lid; and
   a plurality of spikes evenly mounted to the lower surface of the lid and projecting downwardly therefrom, wherein each of said plurality of spikes has a substantially frustoconical shape and being spaced apart from an adjacent spike, whereby the housing is adapted to receive a volume of ice, and when the lid is closed, the plurality of spikes evenly distribute the volume of ice within the open interior region of the housing, the volume of ice cooling air within the housing, the cooled air being transmitted through the plurality of apertures of the lid to a pet resting on the upper surface of the lid.

2. The cooling device as recited in claim 1, wherein the housing is dimensioned and configured to be received within a pet carrier.

3. The cooling device as recited in claim 2, wherein said housing has a substantially rectangular cross-sectional shape.

4. The cooling device as recited in claim 3, wherein said lid has a substantially rectangular cross-sectional shape.

5. The cooling device as recited in claim 1, wherein said housing is formed from a thermal insulation material.

6. The cooling device as recited in claim 1, wherein said lid is formed from a thermal insulation material.

* * * * *